United States Patent
Banach et al.

(10) Patent No.: US 10,924,888 B2
(45) Date of Patent: Feb. 16, 2021

(54) METHOD TO IMPROVE THE DETERMINATION OF A POSITION OF A ROADSIDE UNIT AND A SYSTEM TO PROVIDE POSITION INFORMATION

(71) Applicant: Aptiv Technologies Limited, St. Michael (BB)

(72) Inventors: Marzena Banach, Puszczykowo (PL); Rafal Dlugosz, Poznan (PL)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/654,641

(22) Filed: Oct. 16, 2019

(65) Prior Publication Data
US 2020/0120444 A1 Apr. 16, 2020

(30) Foreign Application Priority Data
Oct. 16, 2018 (EP) .................................. 18200799

(51) Int. Cl.
*H04W 4/02* (2018.01)
*H04W 4/44* (2018.01)
(Continued)

(52) U.S. Cl.
CPC ........... *H04W 4/023* (2013.01); *G01S 5/0027* (2013.01); *G01S 5/0036* (2013.01); *G01S 5/0242* (2013.01);
(Continued)

(58) Field of Classification Search
CPC ..... H04W 4/029; H04W 4/023; H04W 64/00; H04W 4/02; H04W 4/025; H04W 64/003;
(Continued)

(56) References Cited

U.S. PATENT DOCUMENTS

2002/0069019 A1 * 6/2002 Lin .................. G08G 5/045
701/301
2015/0199902 A1 7/2015 Hayee et al.
(Continued)

FOREIGN PATENT DOCUMENTS

CN 102292653 12/2011
CN 103533639 1/2014
(Continued)

OTHER PUBLICATIONS

"Extended European Search Report", EP Application No. 18200799.7, Apr. 17, 2019, 10 pages.
(Continued)

*Primary Examiner* — Fred A Casca
(74) *Attorney, Agent, or Firm* — Colby Nipper PLLC

(57) ABSTRACT

The present invention relates to a method to improve the precision of a position information of a roadside unit (RSU), the RSU at least comprising a data communication unit, a memory unit and a processor unit, wherein a saved RSU position is saved in the memory unit as position information of the RSU. Further, the present invention relates to a roadside unit (RSU), at least comprising a data communication unit, a memory unit and a processor unit. In addition, the present invention relates to a system to provide position information in an area, preferably in respect of an advanced driver assistant system (ADAS) and/or autonomous driving.

18 Claims, 3 Drawing Sheets

(51) Int. Cl.

| | | |
|---|---|---|
| *G08G 1/01* | (2006.01) | |
| *H04B 7/06* | (2006.01) | |
| *H04L 5/00* | (2006.01) | |
| *H04B 7/0413* | (2017.01) | |
| *G01S 5/00* | (2006.01) | |
| *G01S 13/87* | (2006.01) | |
| *G01S 19/46* | (2010.01) | |
| *G01S 5/02* | (2010.01) | |
| *G01S 19/42* | (2010.01) | |
| *G01S 13/931* | (2020.01) | |
| *G01S 7/02* | (2006.01) | |
| *H04B 7/08* | (2006.01) | |
| *H04B 7/024* | (2017.01) | |
| *H04B 5/02* | (2006.01) | |
| *H04B 7/185* | (2006.01) | |

(52) U.S. Cl.
CPC .......... *G01S 5/0249* (2020.05); *G01S 5/0284* (2013.01); *G01S 5/0289* (2013.01); *G01S 13/878* (2013.01); *G01S 19/42* (2013.01); *G01S 19/46* (2013.01); *G08G 1/0116* (2013.01); *H04B 7/0413* (2013.01); *H04B 7/0617* (2013.01); *H04B 7/0619* (2013.01); *H04B 7/0697* (2013.01); *H04L 5/0007* (2013.01); *H04W 4/44* (2018.02); *G01S 5/0063* (2013.01); *G01S 5/0081* (2013.01); *G01S 5/0215* (2013.01); *G01S 5/0273* (2013.01); *G01S 7/023* (2013.01); *G01S 13/876* (2013.01); *G01S 2013/9316* (2020.01); *G01S 2205/002* (2013.01); *H04B 5/02* (2013.01); *H04B 7/024* (2013.01); *H04B 7/0615* (2013.01); *H04B 7/08* (2013.01); *H04B 7/18543* (2013.01)

(58) Field of Classification Search
CPC ....... H04W 4/027; H04W 4/40; H04W 36/32; H04W 84/18; H04W 16/28; H04W 4/44; H04W 4/46; H04W 4/80; H04W 40/22; H04B 17/318; H04B 17/309; H04B 7/0617; H04B 17/27; G01S 5/0284; G06T 7/70; G05D 2201/0213; G05D 1/0276; G08G 1/0129
See application file for complete search history.

(56) References Cited

U.S. PATENT DOCUMENTS

| | | | |
|---|---|---|---|
| 2016/0231746 A1 | 8/2016 | Hazelton et al. | |
| 2016/0234803 A1* | 8/2016 | Smith | G01S 5/0289 |
| 2016/0341557 A1 | 11/2016 | Kondo et al. | |
| 2017/0280281 A1* | 9/2017 | Pandey | H04B 17/21 |
| 2018/0018877 A1 | 1/2018 | Townsend | |
| 2019/0066498 A1 | 2/2019 | Baldwin et al. | |
| 2019/0101929 A1 | 4/2019 | Baldwin | |
| 2019/0302275 A1* | 10/2019 | Tao | G01S 13/931 |
| 2019/0351896 A1* | 11/2019 | Solmaz | B60Q 9/008 |

FOREIGN PATENT DOCUMENTS

| | | |
|---|---|---|
| CN | 105206090 | 12/2015 |
| CN | 108535753 | 9/2018 |
| KR | 20170071207 | 6/2017 |
| WO | 2008001493 | 1/2008 |
| WO | 2012/100154 A1 | 7/2012 |
| WO | 2016126318 A1 | 8/2016 |

OTHER PUBLICATIONS

"Foreign Office Action", Application No. 201910977147.9, dated Sep. 28, 2020, 17 pages.
Amini, et al., "Improving GPS-Based Vehicle Positioning for Intelligent Transportation Systems", Jun. 2014, 7 pages.
Banach, et al., "Real-time Locating Systems for Smart City and Intelligent Transportation Applications", Oct. 2017, pp. 231-234, 4 pages.
Butakov, et al., "Personalized Driver Assistance for Signalized Intersections Using V2I Communication", Jul. 2016, pp. 1910-1919, 10 pages.
Fascista, et al., "A Localization Algorithm Based on V2I Communications and AOA Estimation", Jan. 2017, pp. 126-130, 5 pages.
Gheorghiu, et al., "Messaging capabilities of V2I networks", Jan. 2018, 9 pages.
Hassan, et al., "Vehicle Localization System based on IR-UWB for V2I Applications", Nov. 2013, 4 pages.
Llorente, et al., "UWB technology for safety-oriented vehicular communications", Mar. 2016, 9 pages.
Olaverri-Monreal, et al., "Implementation and Evaluation of a Traffic Light Assistance System Based on V2I Communication in a Simulation Framework", Feb. 2018, 12 pages.
Wang, et al., "A Tightly-Coupled GPS/INS/UWB Cooperative Positioning Sensors System Supported by V2I communication", Nov. 4, 2020, 16 pages.

\* cited by examiner

METHOD TO IMPROVE THE DETERMINATION OF A POSITION OF A ROADSIDE UNIT AND A SYSTEM TO PROVIDE POSITION INFORMATION

CROSS-REFERENCE TO RELATED APPLICATION

This application claims the benefit under 35 U.S.C. § 119(a) of European Patent Application EP 18200799.7, filed Oct. 16, 2018, the entire disclosure of which is hereby incorporated herein by reference.

TECHNICAL FIELD OF INVENTION

The present invention relates to vehicle-to-infrastructure communication.

BACKGROUND OF INVENTION

In the context of the advanced driver assistant systems (ADAS) and ultimately autonomous driving, the use of communication between vehicles and infrastructure (V2I—vehicle-to-infrastructure) is commonly assumed. The devices communicating with vehicles will be permanently located in the elements of the urban and road infrastructure. Such a system based on the V2I communication can perform various tasks. For instance, such a system containing a plurality of roadside units (RSU) can inform vehicles about various unusual traffic situations that may affect safety of driving. Such information will be particular important in situations of poor visibility, for instance fog, bends and/or various obstacles obscuring visibility. Further on, such system can provide information about accidents and/or traffic jams.

SUMMARY OF THE INVENTION

The present invention relates to a method to improve the precision of position in-formation of a roadside unit (RSU), the RSU at least comprising a data communication unit, a memory unit and a processor unit, wherein a saved RSU position is saved in the memory unit as position information of the RSU. Further, the invention relates to a roadside unit (RSU), at least comprising a data communication unit, a memory unit and a processor unit. In addition, the present invention relates to a system to provide position information in an area, preferably in respect of an advanced driver assistant system (ADAS) and/or autonomous driving.

In each of the situations mentioned above, an important issue is to determine with an appropriate precision the positions of the respective RSU devices relative to moving vehicles. The required locating accuracy will depend on how much this information is critical to the safety of the moving vehicles. Especially high precision will be important in the case of direct support for autonomous driving.

According to the state of the art it is known for RSU devices to contain GPS devices for actively determining the exact position of the respective RSU. These GPS-based solutions have nevertheless limitations. One of the important issues is the power dissipation of such devices as in most of the cases a direct access to a power line is required. Further on, especially in dense urban areas, these GPS devices may suffer from reception errors, for instance due to a blocked satellite reception.

Another possibility of a method of positioning an RSU device is a direct communication between this device and a single passing vehicle. This communication can contain multiple localization information of the moving vehicle, for instance a trajectory of the vehicle determined based on the vehicle's GPS data, as well as on data provided by on-board sensors of the vehicle to determine a yaw rate, a velocity, and similar measures of the vehicle. Also this method to determine the position of the RSU can be erroneous. On the one hand, external conditions, for instance temperature and/or humidity, can affect the reaction time of the RSU device. Another unfavourable factor is the limited accuracy of the on-board sensors of the vehicle, on the basis of which the trajectory of the vehicle is determined. Errors in localization information of the vehicle are therefore passed down into the determined position of the RSU. Also errors due to ambiguities, when a group of positions of the RSU unit are determined out of the localization information of the vehicle instead of one single position, can contribute to the overall error of the position determination.

In view of the above, it is an object of the present invention to provide an improved method to improve the precision of position information of a road-side unit, a road-side unit and a system to provide position information in an area, which do not have the aforementioned drawbacks of the state of the art.

This objective is solved by the patent claims. In particular, this objective is solved by a method to improve the precision of a position information of a roadside unit (RSU) according to claim 1, by a roadside unit (RSU) according to claim 9 and by a system to provide position information in an area according to claim 13. The dependent claims describe preferred embodiments of the invention.

According to a first aspect of the invention the problem is solved by a method to improve the precision of position information of a roadside unit (RSU), the RSU at least comprising a data communication unit, a memory unit and a processor unit, wherein the saved RSU position is saved in the memory unit as position information of the RSU. A method according to the invention comprises the following steps:

a) Establishing a data communication with a moving communication partner in the vicinity of the RSU, b) Receiving a plurality of localization information of the communication partner via the data communication established in step a), c) Calculating a preliminary RSU position out of the plurality of localization information received in step b), d) Loading the saved RSU position from the memory unit of the RSU into the processor unit, e) calculating an improved RSU position using the preliminary RSU position calculated in step c) and the saved RSU position loaded in step d), f) Saving the improved RSU position calculated in step e) into the memory unit of the RSU as new saved RSU position and as position information of the RSU.

The purpose of a method according to an invention is to determine position information and especially improve the precision of this position information of a road-side unit. Such a RSU can be preferably mounted on roadside infrastructure and can be part of a system containing a plurality of such RSUs. If the precision of the position information of all RSUs in the system is high enough and the system is containing a dense network of distributed RSU devices in an area, these RSUs can provide a network of known positions, especially to provide a basis of autonomous driving for vehicles in this area. Such a RSU device at least comprises a processor unit and a memory unit, wherein in the memory unit position information of the RSU is saved. This saved RSU position can be transmitted to the passing-by vehicles by a data communication unit, which is also part of the RSU.

The present method according to the invention improves the precision of position information saved in the memory unit of the RSU. In a first step a) of the inventive method a data communication with a moving communication partner in the vicinity of the RSU is established. The moving communication partner can be for instance a vehicle, preferably a car. In other words, after step a) of a method according to the invention, a data communication, especially a two-way data communication, between the moving communication partner and the RSU is established and data can be exchanged between the RSU and the communication partner.

This data communication is used in the next step b) of a method according to the invention to receive a plurality of localization information of the communication partner. As the communication partner is moving, this localization information can be a trajectory of the communication partner and/or a plurality of points along the path of the communication partner. For instance, a vehicle as communication partner can be provided with a GPS device and/or several internal sensors to determine a trajectory of the communication partner during its movement in the vicinity of the RSU. This trajectory can be split up into a plurality of localization information, which can be sent from the moving communication partner to the RSU via the data communication. The sending and receiving of the localization information can be carried out continuously during the movement of the communication partner in the vicinity of the RSU and/or combined in one or more communication slices during and/or at the end of the movement of the communication partner in vicinity of the RSU.

The next step c) of a method according to the invention comprises calculating a preliminary RSU position out of the plurality of localization information received in step b). In other words, the plurality of localization information of the communication partner is used to determine the position of the RSU in respect to the moving communication partner. For instance, each localization information can comprise a distance between the RSU and the communication partner at the respective position and/or the respective position of the communication partner. This information can be used to calculate a preliminary position of the RSU itself.

Further on in the next step d) of a method according to the invention the saved RSU position already present in the memory unit of the RSU is loaded from the memory unit into the processor unit of the RSU. In other words, after step d) in the processor unit two different position information are present, the preliminary RSU position calculated in step c) and the saved RSU position loaded out of the memory unit, wherein this saved RSU position is up to now used as position information of the RSU.

These two position information are used in the following step e) of a method according to the invention to improve the RSU position by calculating an improved RSU position based on the preliminary RSU position calculated in step c) and the saved RSU position loaded into the processor unit in step d) of a method according to the invention. To calculate the improved RSU position for instance a mean value, preferably a weighted mean value, of the preliminary RSU position and the saved RSU position is calculated. By doing so, the improved RSU position is based on an enlarged data set in respect to the saved RSU position, as the preliminary RSU position is added to the database out of which the improved RSU position is calculated. Therefore an error of the improved RSU position can be lowered.

In the last step f) of a method according to the invention the improved RSU position is saved into the memory unit of the RSU as new saved RSU position and as the position information of the RSU. In other words, the improved RSU position replaces the formerly saved RSU position as new saved RSU position. As the saved RSU position is used as position information of the RSU, hence also the position information of the RSU can be improved.

In summary, according to an inventive method a data communication to a moving communication partner, preferably to a moving vehicle, in the vicinity of the RSU can be used as a basis to calculate and improve already existing position information of the RSU. Preferably, a method according to the invention can be carried out for several, especially for a plurality, of moving communication partners. Therefore, according to an inventive method a usage of communication to a plurality of moving communication partners in the vicinity of the RSU can be used as a basis to calculate and improve the position information of the RSU. Each of these data connections provides preliminary position information which is used in a method according to the invention to improve the position information saved in the RSU. As mentioned above, the position information of the RSU can preferably be calculated as weighted mean of an already saved RSU position and a newly calculated preliminary RSU position. As effect, the overall error of the position information of the RSU can be lowered due to these multiple measurements. Further, the RSU, especially as part of a system comprising a plurality of RSU devices, can provide reliable position information, especially as a basis for autonomous driving.

Further, the method according to the invention can be characterized in that steps a) to f) are carried out consecutively in at least two determination repetitions, especially more than 100 determination repetitions, preferably more than 1000 determination repetitions, for different communication partners and/or at different instants of time. Each determination repetition contains all steps a) to f) of a method according to the invention. Therefore, in each determination repetition a communication partner, preferably a different communication partner, is used to gain localization information and based on these to improve the already saved RSU position. Therefore in general, the error of the position information of the RSU will be the lower, the more determination repetitions are used. A number of 100, preferably 1000, determination repetitions has been found to be a reasonable compromise between precision and effort. By using different communication partners, an elimination of errors due to specific defects of the particular communication partner can be eliminated. In addition, different instants of time for the several determination repetitions allow taking into account changing environmental conditions like different time of the day and/or of the year, temperatures, humidity and so on. By using different communication partners and/or different instants of time for the determination repetitions the precision of the position information of the RSU can be further improved.

A method according to the invention can be further improved in that during the at least two determination repetitions, after step f) at least once an additional step g) is carried out before the next determination repetition, wherein step g) comprises a break before the next determination repetition, especially a break of more than 1 minute, preferably as break of more than 180 minutes. By inserting at least once an additional step g) with a break into a determination repetition it can be secured in an easy and cost efficient way that the determination repetitions are carried out with different communication partners and/or at different instants of time. The aforementioned advantages based on different communication partners and/or different instants of time for the determination repetitions can be therefore achieved especially easily.

The method according to the invention can be further improved in that after the last determination repetition, steps a) to d) and an additional step h) are carried out, especially repeatedly in control repetitions, preferably continuously, wherein in step h) the preliminary RSU position is compared to a maximum position deviation based on the saved RSU position, wherein preferably steps a) to f) are started all over if the preliminary RSU position is beyond the maximum position deviation. After the last determination repetition the improvement of the RSU position of the RSU is stopped and the saved RSU position is continuously used as position information of the RSU. By carrying out steps a) to d) the preliminary RSU position is still calculated. In the additional step h) this preliminary RSU position is compared to a maximal position deviation based on the saved RSU position. In other words, this forms a control loop, in which it is monitored whether the preliminary RSU position and the saved RSU position match within the maximum position deviation. This allows to detect critical errors of the RSU itself, for instance whether the RSU is moved to another position and/or an orientation of the RSU is changed. In other words, by carrying out steps a) to d) and step h) a self-monitoring of the RSU can be provided. If a preliminary RSU position beyond the maximum position deviation is detected, a first possible reaction is to shut down the RSU. Alternatively, as a second and preferred reaction, the RSU can start all over and carry out steps a) to f) of a method according to the invention, preferably in several determination repetitions, to provide a recalibration of the position information of the RSU.

Further on, the method according to the invention can be characterized in that in step c) the preliminary RSU position and/or in step e) the improved RSU position are calculated in a global coordinate system (GCS). Such a usage of a global coordinate system allows an especially broad usability of the position information of the RSU provided by the data communication unit via the established data communication. Preferably, the global coordinate system is based on the GPS system.

Additionally, the method according to the invention can be characterized in that in step e) the improved RSU position is recursively calculated. This allows minimizing the amount of data needed to be stored in the memory unit of the RSU. In addition this leads to low energy consumption as less powerful and power consuming processor units can be used. Also the overall calculation costs can be lowered. For instance, the improved RSU position can be iteratively calculated as weighted mean of the preliminary RSU position and the saved RSU position, wherein for the weighting the saved RSU altered by the signed deviation of the preliminary RSU position and the saved RSU position divided by the number of completed determination repetitions. As a further simplification, the number of completed determination repetitions can be approximated by the next larger power of two. Especially for larger numbers of determination repetitions, this turned out to be an appropriate approximation with no or at least negligible effects on the accuracy of the calculated improved RSU position. Especially, replacing the number of completed determination repetitions by a power of two allows replacing the division operation by a simple bit shift operation, whereby the computational effort can be lowered further.

Further on, the method according to the invention can be characterized in that the improved RSU position calculated in step e) includes accuracy information, especially a variance of the improved RSU position. Such accuracy information is a measure for the quality of the calculated position. In addition, accuracy information provides more data in more information about the improved RSU position and whether it is of value. Also this accuracy information can be preferably be calculated recursively and/or iteratively as already described above in respect to the improved RSU position.

The method according to the invention can be improved in that in step e) the preliminary RSU position is compared to a maximum accuracy deviation based on the saved RSU position and the accuracy information, wherein the saved RSU position is used unchanged as the improved RSU position, if the preliminary RSU position is beyond the maximum accuracy deviation. In other words, the saved RSU position includes accuracy information and based on the saved RSU position and this accuracy information a maximum accuracy deviation is calculated. If the preliminary RSU position is beyond this maximum accuracy deviation, in other words if the preliminary RSU position is a position far off the saved RSU position, the resulting improved RSU position would have a lower accuracy, if this particular preliminary RSU position is used. Therefore, the accuracy of the RSU position information can be improved, if this particular preliminary RSU position is declined and skipped respectively, and the saved RSU position is used unchanged as the new improved RSU position. In summary, in this preferred embodiment of a method according to the invention, data points of preliminary RSU positions with low accuracy are avoided. In total, an improved RSU position with high accuracy can be obtained.

According to a second aspect of the invention the objective is solved by a roadside unit, at least comprising a data communication unit, a memory unit and a processor unit. A roadside unit according to the invention is characterized in that the data communication unit, the memory unit and the processor unit are configured to carry out a method according to the first aspect of the invention. All advantages, which are described above in respect to a method according to the invention, can also be provided by a roadside unit according to the invention, whose data communication unit, memory unit and processor unit are configured to carry out a method according to the first aspect of the invention.

Further on, a roadside unit according to the invention can be characterized in that the memory unit is a non-volatile memory unit, preferably a flash type memory unit. Such non-volatile memory units comprise especially no or at least low power consumption. The overall power consumption of a roadside unit according to the invention therefore can be lowered.

In addition, a roadside unit according to the invention can be characterized in that the processor unit comprises an additional processor memory unit, preferably a RAM processor memory unit. Such an additional processor memory unit allows a fast processing and computing in the processor unit. This allows carrying out a method according to the invention in an especially fast and simultaneously precise way.

Further, a roadside unit according to the invention can be characterized in that the RSU comprises an arrangement section adapted to be mounted on a roadside infrastructure, especially a roadside post and/or a traffic sign. Such an arrangement section provides easily mounting of the RSU on the roadside infrastructure. The roadside infrastructure itself can preferably comprise a counter-arrangement section to engage the arrangement section of the RSU. The arrangement section can preferably be constructed in a standardized way to lower manufacturing costs.

According to a third aspect of the invention the objective is solved by a system to provide position information in an area, preferably in respect of an advanced driver assistant system (ADAS) and/or autonomous driving. A system according to the invention is characterized in that the system comprises a plurality of roadside units according to the second aspect of the invention, wherein the RSUs provide a position information of the RSU via a data communication for communication partners in the vicinity of the respective RSU, and preferably wherein the RSUs are at least essentially covering the area and/or are at the least essentially evenly distributed in the area. A RSU according to the second aspect of the invention comprises a data communication unit, a memory unit and a processor unit which are configured to carry out a method according to the first aspect of the invention. In summary, a system according to the third aspect of the invention comprise all advantages, which are described in respect to an RSU unit according to the second aspect of the invention and in respect to a method according to the first aspect of the invention.

By comprising a plurality of roadside units covering the area and/or essentially evenly distributed in the area, a position information can be provided essentially everywhere in the area, as every point in the area should be in the vicinity of at least one RSU. An advanced driver assistant system and/or preferably autonomous driving can therefore be provided based on the position information provided by the system according to the invention.

Preferably, a system according to the invention can be characterized in that the RSUs are positioned within the area at least essentially at the same height above the respective ground level. If the RSUs are positioned at the same height the position information of the RSU can be provided essentially in a two-dimensional form. The third dimension is the same for all RSUs, as the RSUs are positioned at the same height above the respective ground level of the RSU. Hence, lower data traffic, lower computational effort and accordingly lower costs can be achieved.

Further on, a system according to the invention can be characterized in that the RSUs comprise an arrangement section adapted to be mounted on a roadside infrastructure and are mounted on a roadside infrastructure, especially a roadside post and/or a traffic sign. Mounting the RSUs on a roadside infrastructure is an especially easy way to ensure a mounting of the RSUs in the vicinity of roads. Road-side infrastructure, as for instance roadside posts and/or traffic signs, are broadly available along roads. No or at least low additional costs for mounting the RSUs can therefore be achieved. In addition, also positioning of the RSUs at the same height above the respective ground level can be provided easily, if roadside infrastructure is used for mounting of the RSUs.

BRIEF DESCRIPTION OF DRAWINGS

The present invention is further described hereinafter with reference to illustrated embodiments shown in the accompanying drawings. Elements with the same function are specified throughout the figures with the same reference signs. In the following, any statement made having regard to the direction of a component are made relative to the position shown in the drawing and can naturally vary in the actual position of the application. The figures show in a schematic way.

DETAILED DESCRIPTION

Figure 1:
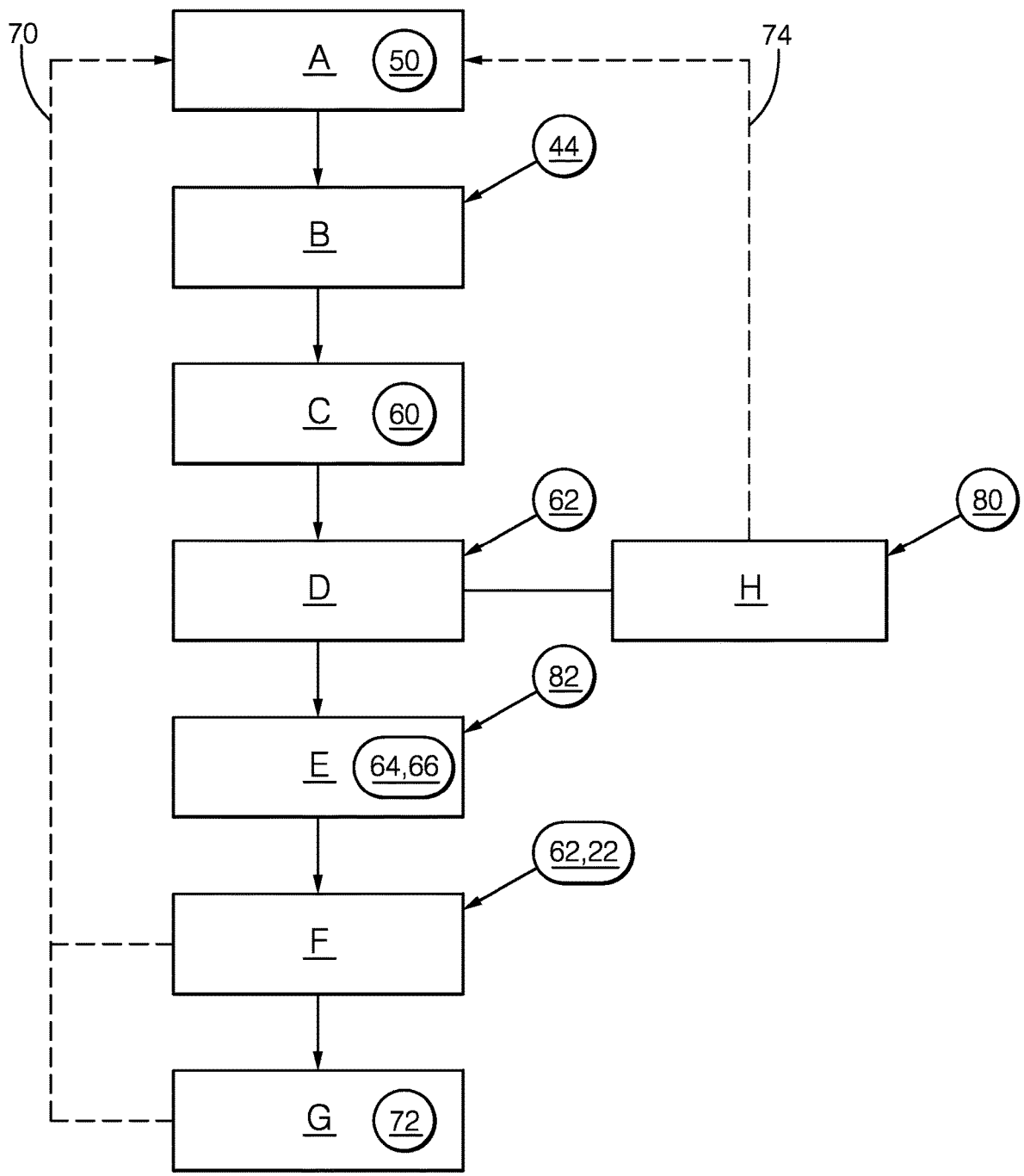
FIG. 1 a method according to the invention,
FIG. 2 a roadside unit according to the invention, and
FIG. 3 a system according to the invention.
Figure 2:
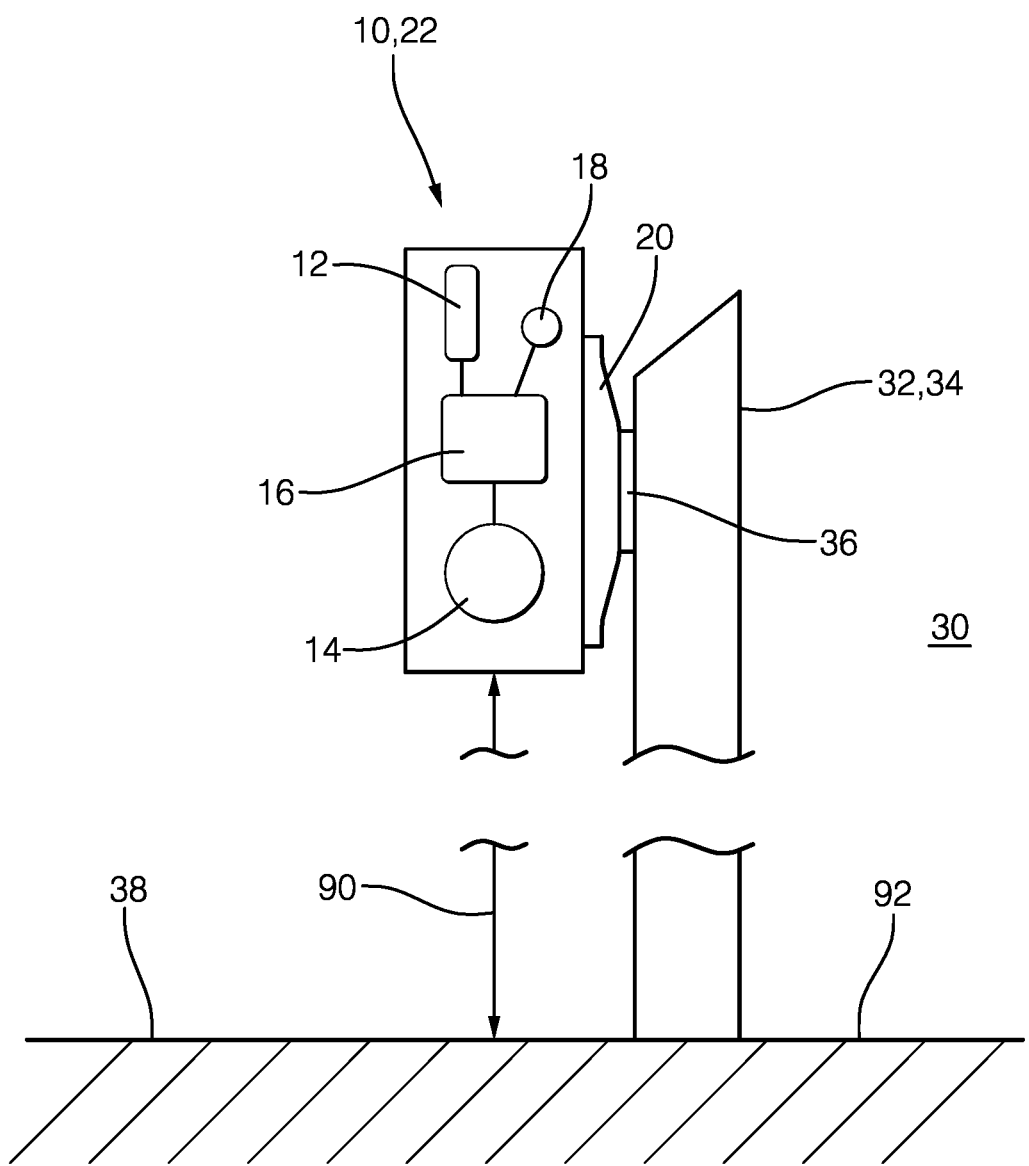

FIG. 1 shows a method according to the invention which can be carried out by a road-side unit (RSU) 10 as shown in FIG. 2. Such a RSU 10 can be part of a system 100, in which plurality of RSUs 10 are distributed preferably evenly in an area 30. By covering the area 30, the RSUs 10 can provide position information 22 in the area 30, preferably in respect to an advanced driver assistant system (ADAS) and/or autonomous driving. In the following, the three figures FIG. 1 to FIG. 3 are described together.

Figure 3:
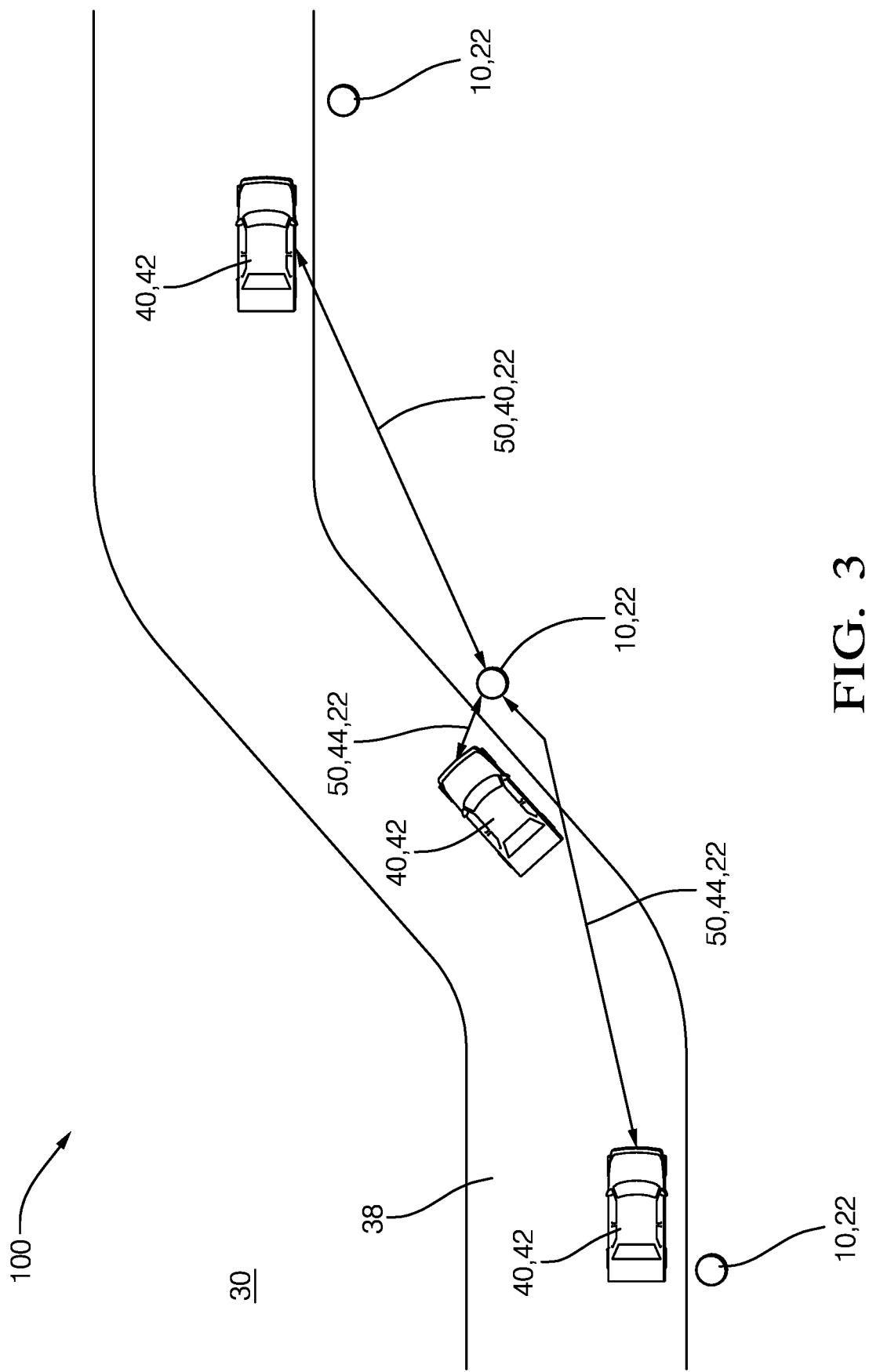

A system 100 as depicted in FIG. 3 can comprise a plurality of roadside units 10 as shown in FIG. 2. The roadside units 10 can be placed along a road 38, for instance mounted on roadside infrastructure 32, for instance a roadside post 34, see FIG. 2. As shown in FIG. 3, the RSUs 10 can provide a position information 22 to a communication partner 40, especially a vehicle 42, in the vicinity of the roadside unit 10. A roadside unit 10 according to the invention can be able to carry out a method according to the invention to improve the precision of a position information 22 provided by the roadside unit 10.

To be able to carry out the method according to the invention, a roadside unit 10 according to the invention least comprises a data communication unit 12, a memory unit 14 and a processor unit 16. Further on, a roadside unit 10 can comprise additionally a processor memory unit 18, especially a RAM processor memory unit 18, to enhance the computing capabilities of the roadside unit 10. Additionally, the memory unit 14 can be a non-volatile memory unit 14, for instance a flash-type memory unit 14, to lower the overall power consumption of the RSU 10. An arrangement section 20 can be used to ensure easily mounting on a roadside infrastructure 32, wherein the roadside infrastructure 32 itself can comprise a counter-arrangement section 36. The roadside unit 10 of the system 100 in the area 30 can, as shown in FIG. 2, be preferably mounted at the same height 90 above ground level 92. The position information 22 of the roadside unit 10 can in this case be two-dimensional, whereby this allows lowering the data traffic between the roadside unit 10 and a communication partner 40 in the vicinity of the roadside unit 10.

To improve the precision of position information 22 of the roadside unit 10 the RSU 10 can be enabled to carry out a method according to the invention as shown in FIG. 1. In a first step a), A in FIG. 1, a data communication 50 is established with a moving communication partner 40 in the vicinity of the RSU 10. This is shown for the RSU 10 placed in the middle of FIG. 3. The moving communication partner 40 is in this case a vehicle 42, shown in three different positions in the vicinity of the respective RSU 10. This vehicle 42 can comprise localization information 44 along its path in the vicinity of the respective RSU 10, for instance based on GPS measurements and/or on internal sensors of the vehicle 42. In the next step b) of a method according to the invention, see B in FIG. 1, this localization information 44 is received by the respective RSU 10 via the data communication 50. Next step c), C in FIG. 1, comprises the calculating of a preliminary RSU position 60 out of the plurality of localization information 44 received in former step b). All these calculations are carried out in the processor unit 16 of the RSU 10. Next step d), see D in FIG. 1, comprises loading an already saved RSU position 62 from the memory unit 14 of the RSU 10 into the processor unit 16. Step e), see E in FIG. 1, includes calculating an improved RSU position 64 using the preliminary RSU position 60 calculated in step c) and the saved RSU position 62 loaded into the processor unit 16 within step d). Preferably, these calculations include additional accuracy information and are carried recursively and/or iteratively. Preferably, step e) includes a comparison between the preliminary RSU position 60 and an accuracy deviation 82, which is based on the saved RSU position 62 and the accuracy information 66. This allows rejecting a preliminary RSU position 60 which is beyond the maximum accuracy deviation 82 and therefore to avoid data points with especially low accuracy and/or a large deviation from the present saved RSU position 62. The overall accuracy of the position information 22 of the roadside unit 10 can therefore be improved. The last step f) of a method according to the invention, see F in FIG. 1, includes saving the improved RSU position 64 calculated in the step e) into the memory unit 14 of the RSU 10 as new saved RSU position 62 and as the position information 22 of the RSU 10.

In other words, a method according to the invention preferably uses multiple connections to a plurality of communication partners 40 in the vicinity of the RSU 10 to improve the position information 22 of the roadside unit 10. Each connection provides a preliminary RSU position 60 which is in turn used to improve the already saved RSU position 62 into an improved RSU position 64. Due to the multiple measurements the error of the position information 22 of the roadside unit 10 can be lowered. Steps a) to f) can be carried out consecutively in at least two determination repetitions 70, preferably more than 100 of even 1000 determination repetitions 70. At least one of these determination repetitions 70 can be delayed by an additional step g), see G in FIG. 1, which includes a brake 72 before the next determination repetition 70 to ensure that the determination repetitions 70 are carried at different instants of time. Additionally, the different determination repetitions 70 can be carried out for different communication partners 40. This allows eliminating errors due to specific defective vehicles 42 as communication partners 40 and/or eliminating errors due to time dependent environmental conditions like day and night time, seasons, temperatures and/or humidity. After the last determination repetition 70, control repetitions 74 including the steps a) to d) and an additional step h), see H in FIG. 1, can be carried out. In step h) the preliminary RSU position 60 calculated in step d) is compared to a maximum position deviation 80 to allow a determination, whether the actual preliminary RSU position 60 lies within the maximum position deviation 80. If this is not the case, the RSU 10 can be shut down. Preferably, the RSU 10 is not shut down but the steps a) to f) are started all over, especially in several determination repetitions 70, to provide a recalibration of the position measurement of the roadside unit 10.

We claim:

1. A method to improve a precision of a position information of a road-side unit (RSU), the RSU at least comprising a data communication unit, a memory unit and a processor unit, wherein a saved RSU position is saved in the memory unit as position information of the RSU,
comprising the following steps carried out consecutively in at least two determination repetitions for different communication partners or at different times:
  a) establishing a data communication with a moving communication partner in a vicinity of the RSU,
  b) receiving a plurality of localization information of the moving communication partner via the data communication established in step a),
  c) calculating a preliminary RSU position out of the plurality of localization information received in step b),
  d) loading the saved RSU position from the memory unit of the RSU into the processor unit,
  e) calculating an improved RSU position using the preliminary RSU position calculated in step c) and the saved RSU position loaded in step d),
  f) saving the improved RSU position calculated in step e) into the memory unit of the RSU as a new saved RSU position and as the position information of the RSU, and
  g) causing a break before a next of the at least two determination repetitions.

2. The method according to claim 1, wherein steps a) to f) are carried out consecutively in more than 100 determination repetitions.

3. The method according to claim 1, wherein steps a) to f) are carried out consecutively in more than 1000 determination repetitions.

4. The method according to claim 1, wherein the break is more than 1 minute.

5. The method according to claim 1, wherein the break is more than 180 minutes.

6. The method according to claim 1, wherein after the last determination repetition, steps a) to d) and an additional step h) is carried out, wherein in step h) the preliminary RSU position is compared to a maximum position deviation based on the saved RSU position.

7. The method according to claim 6, wherein steps a) to f) are started all over if the preliminary RSU position is beyond the maximum position deviation.

8. The method according claim 1, wherein at least one of: in step c) the preliminary RSU position is calculated in a global coordinate system (GCS), and in step e) the improved RSU position is calculated in the GCS.

9. The method according to claim 1, wherein in step e) the improved RSU position is recursively calculated.

10. The method according to claim 1, wherein the improved RSU position calculated in step e) includes accuracy information.

11. The method according to claim 10, wherein in step e) the preliminary RSU position is compared to a maximum accuracy deviation based on the saved RSU position and the accuracy information, and wherein the saved RSU position is used unchanged as the improved RSU position, if the preliminary RSU position is beyond the maximum accuracy deviation.

12. A roadside unit (RSU), comprising:
a data communication unit,
a memory unit, and
a processor unit, wherein the processor unit saves a saved RSU position in the memory unit as position information of the RSU, wherein
the processor unit is configured to consecutively perform the following in at least two determination repetitions for different communication partners or at different times:
  establish a data communication with a moving communication partner in a vicinity of the RSU;
  receive a plurality of localization information of the moving communication partner via the data communication;

calculate a preliminary RSU position out of the plurality of localization information;

load the saved RSU position from the memory unit of the RSU into the processor unit;

calculate an improved RSU position using the preliminary RSU position and the saved RSU position;

save the improved RSU position calculated into the memory unit of the RSU as a new saved RSU position and as the position information of the RSU; and cause a break before a next of the at least two determination repetitions.

13. The RSU according to claim 12, wherein the memory unit is a non-volatile memory unit.

14. The RSU according to claim 12, wherein the processor unit comprises an additional processor memory unit.

15. The RSU according to claim 12, wherein the RSU comprises an arrangement section adapted to be mounted on a road side infrastructure.

16. A system to provide position information in an area, wherein the system comprises a plurality of roadside units (RSU) according to claim 12, and wherein the RSUs provide position information of the RSUs via data communication for communication partners in the vicinity of the RSUs, and wherein the RSUs cover the area are evenly distributed in the area, wherein at least one RSU of the RSUs includes a processing unit configured to:

store a saved RSU position in a memory unit as position information of the at least one RSU; and consecutively perform the following in at least two determination repetitions for different communication partners or at different times:

establish a data communication with a moving communication partner in a vicinity of the at least one RSU;

receive a plurality of localization information of the moving communication partner via the data communication;

calculate a preliminary RSU position out of the plurality of localization information;

load the saved RSU position from the memory unit into the processor unit;

calculate an improved RSU position using the preliminary RSU position and the saved RSU position;

store the improved RSU position calculated into the memory unit as a new saved RSU position and as the position information of the at least one RSU; and cause a break before a next of the at least two determination repetitions.

17. The system according to claim 16, wherein the RSUs are positioned within the area at least at the same height above ground level.

18. The system according to claim 16, wherein the RSUs comprise an arrangement section adapted to be mounted on a road side infrastructure and are mounted on the road side infrastructure, especially a road side post and/or a traffic sign.

* * * * *